(12) United States Patent
Takeda (10) Patent No.: US 8,193,774 B2
(45) Date of Patent: Jun. 5, 2012

(54) BATTERY PACK

(75) Inventor: Takashi Takeda, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 331 days.

(21) Appl. No.: 12/602,201

(22) PCT Filed: Jun. 25, 2008

(86) PCT No.: PCT/JP2008/061520
§ 371 (c)(1),
(2), (4) Date: Nov. 30, 2009

(87) PCT Pub. No.: WO2009/001844
PCT Pub. Date: Dec. 31, 2008

(65) Prior Publication Data
US 2010/0201327 A1  Aug. 12, 2010

(30) Foreign Application Priority Data

Jun. 25, 2007  (JP) ................................. 2007-166666

(51) Int. Cl.
*H02J 7/00* (2006.01)
*H02J 7/04* (2006.01)
*H02J 7/16* (2006.01)

(52) U.S. Cl. ........ 320/134; 320/136; 320/150; 320/154; 320/128

(58) Field of Classification Search .................. 320/150, 320/134
See application file for complete search history.

(56) References Cited

U.S. PATENT DOCUMENTS

| 5,604,419 | A | * | 2/1997 | Bisschop et al. | 320/150 |
| 7,375,498 | B2 | * | 5/2008 | Yamamoto | 320/150 |
| 2001/0030526 | A1 | * | 10/2001 | Bohne | 320/150 |
| 2005/0134232 | A1 | | 6/2005 | Yamamoto | |
| 2006/0208850 | A1 | | 9/2006 | Ikeuchi et al. | |
| 2006/0255771 | A1 | * | 11/2006 | Sakakibara | 320/150 |
| 2011/0163701 | A1 | * | 7/2011 | Carrier et al. | 318/139 |

FOREIGN PATENT DOCUMENTS

| JP | 5-121102 | 5/1993 |
| JP | 8-128902 | 5/1996 |
| JP | 2002-044871 | 2/2002 |
| JP | 2004-152580 | 5/2004 |
| JP | 2005-183098 | 7/2005 |
| JP | 2006-254650 | 9/2006 |

* cited by examiner

*Primary Examiner* — Edward Tso
*Assistant Examiner* — Ahmed Omar
(74) *Attorney, Agent, or Firm* — IPUSA, PLLC (57) ABSTRACT

In a battery pack including a protection circuit, a series circuit of a thermistor and a resistor is disposed in a vicinity of a secondary battery and connected in parallel with the secondary battery. A connection detecting circuit is disposed to detect connection of a charging device to the battery pack. A comparator is disposed to compare a voltage of a junction point of the thermistor and the resistor with a reference voltage corresponding to a predetermined temperature. A gate circuit is disposed to activate an output signal of the comparator only when the connection of the charging device is detected. The protection circuit is arranged so that, when a temperature of the secondary battery exceeds the predetermined temperature, a switch element is turned off in accordance with the output signal of the comparator activated.

3 Claims, 5 Drawing Sheets

BATTERY PACK

TECHNICAL FIELD

This invention generally relates to a battery pack, and more particularly relates to a battery pack including a protection circuit which detects an overcharge, an overdischarge, and an overcurrent of a secondary battery and turns off a switch element disposed on a wiring line between the secondary battery and a load or a charging device.

BACKGROUND ART

In recent years, a portable device, such as a digital camera, carries a lithium ion battery as a secondary battery. Because lithium ion batteries are prone to overcharge or overdischarge, the lithium ion batteries are arranged with a battery pack including a protection circuit for protecting the batteries from overcharge or overdischarge.

Figure 4:
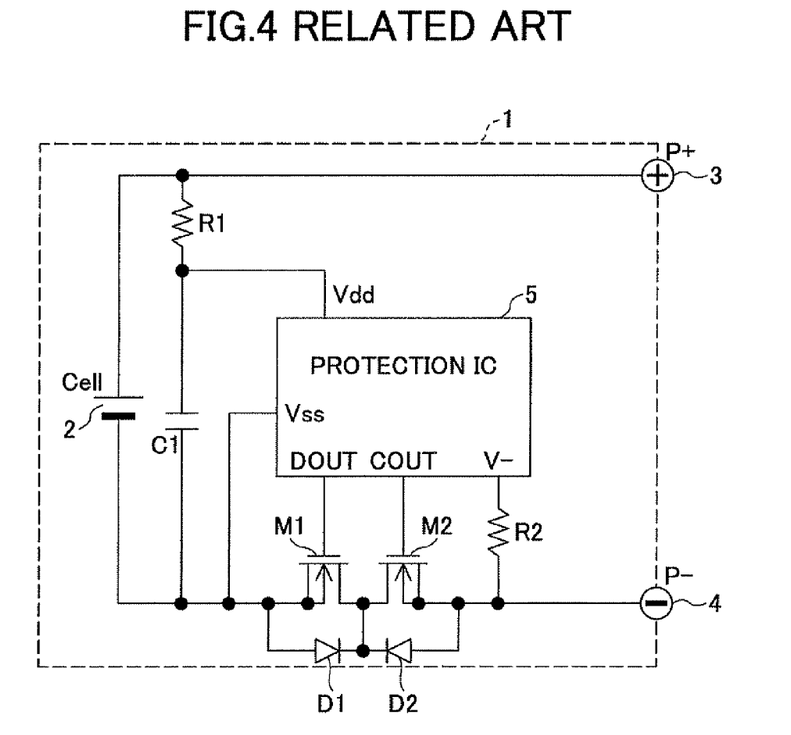
FIG. 4 is a block diagram illustrating the composition of a battery pack according to the related art.
Figure 5:
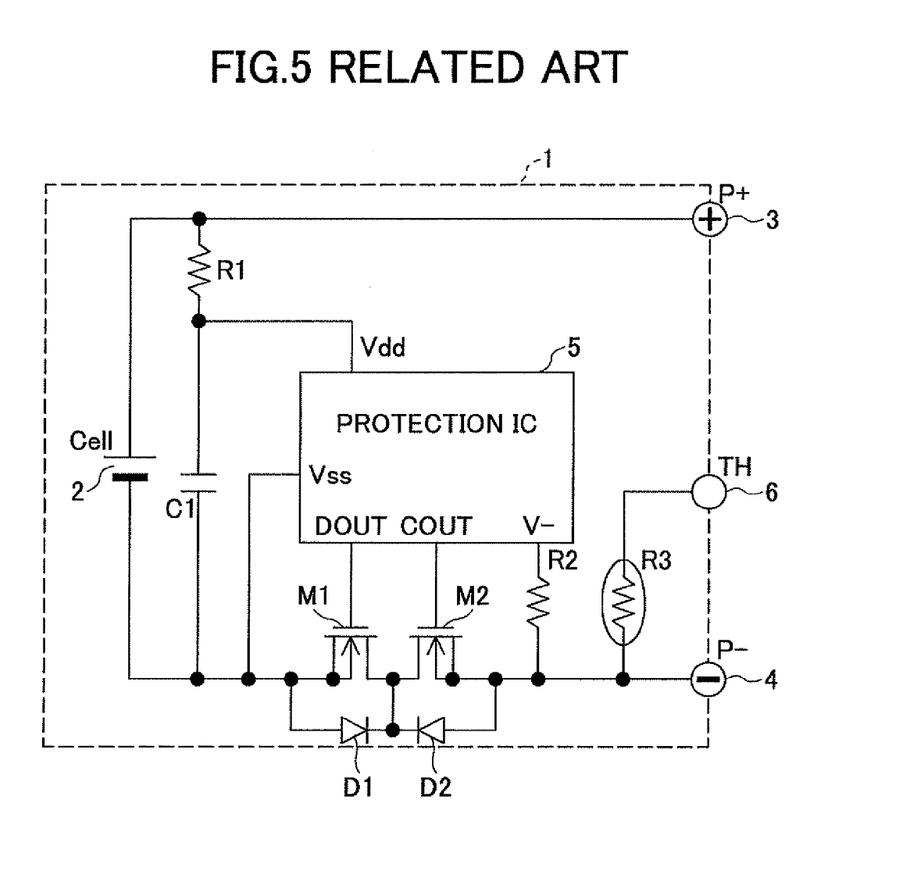
FIG. 5 is a block diagram illustrating the composition of another battery pack according to the related art.

FIGS. 4 and 5 illustrate the composition of respective battery packs according to the related art. In the battery pack 1 of FIG. 4, a series circuit in which a capacitor C1 and a resistor R1 are connected in series is connected in parallel with a lithium ion battery 2. A positive electrode of the lithium ion battery 2 is connected to an external terminal 3 of the battery pack 1, and a negative electrode of the lithium ion battery 2 is connected to an external terminal 4 of the battery pack 1 through a pair of n channel MOS (metal oxide semiconductor) transistors M1 and M2 for current cutoff.

The drains of the MOS transistors M1 and M2 are connected to each other, the source of the MOS transistor M1 is connected to the negative electrode of the lithium ion battery 2, and the source of the MOS transistor M2 is connected to the external terminal 4. Body diodes D1 and D2 of the MOS transistors M1 and M2 are connected between the drain and the source of each of the MOS transistors M1 and M2 respectively in an equivalent manner.

A protection IC (integrated circuit) 5 is arranged in the battery pack 1 to include an overcharge detection circuit, an overdischarge detection circuit, and an overcurrent detection circuit. A power-source voltage Vdd from the positive electrode of the lithium ion battery 2 is supplied to the protection IC 5 through a resistor R1, and a power-source voltage Vss from the negative electrode of the lithium ion battery 2 is supplied to the protection IC 5. Thus, the protection IC 5 operates.

When an overdischarge or an overcurrent of the secondary battery is detected by the overdischarge detection circuit or the overcurrent detection circuit, the protection IC 5 sets a DOUT output signal to a low level and turns off the MOS transistor M1. When an overcharge of the secondary battery is detected by the overcharge detection circuit, the protection IC 5 sets a GOUT output signal to a low level and turns off the MOS transistor M2.

In the battery pack 1 of FIG. 5, a thermistor R3 is arranged further. One end of the thermistor R3 is connected to a terminal 6 of the battery pack 1, and the other end of the thermistor R3 is connected to the external terminal 4. At the time of charging, a predetermined voltage from a charging device is supplied to the terminal 6 of the battery pack 1 through a potential-divider resistor. The voltage of the terminal 6 changes because a resistance of the thermistor R3 changes according to a temperature of the battery pack 1. The voltage of the terminal 6 is detected and the charging device is controlled to stop the charging when the temperature of the battery pack 1 exceeds a predetermined temperature.

Patent Document 1 listed below discloses a battery pack in which a first diode disposed in a first direction and connected in series to a temperature protection element (PTC element) and a second diode disposed in a second direction opposite to the first direction and connected in parallel with the first diode and the temperature protection element (PTC element) are connected to a secondary battery. This battery pack is arranged so that, at the time of normal discharging of the secondary battery, a current flows through the second diode in the second direction only and does not flow through the first diode in the first direction. Thus, even when a temperature of the battery pack becomes high at the time of normal discharging, no current flows through the first diode, and it is possible to inhibit operation of the temperature protection element (PTC element).

Patent Document 1: Japanese Laid-Open Patent Publication No. 2004-152580

DISCLOSURE OF INVENTION

Problem to be Solved by the Invention

The battery pack according to the related art as illustrated in FIG. 4 does not provide any protection function with respect to the temperature of the battery pack. The battery pack according to the related art as illustrated in FIG. 5 provides a protection function with respect to the temperature of the battery pack. However, in the battery pack of FIG. 5, the predetermined voltage from the charging device is supplied through the potential-divider resistor to the battery pack. If the potential-divider resistor of the charging device has an error or if the predetermined voltage of the charging device changes, it is difficult to detect a temperature of the battery pack accurately.

Accordingly, it is an object of the invention to provide a battery pack which performs a protection function with respect to the temperature of a secondary battery with good accuracy only when a charging device is connected, thereby preventing the self-heating of the battery pack at the time of discharging.

Means to Solve the Problem

In an embodiment of the invention which solves or reduces one or more of the above-mentioned problems, the present disclosure provides a battery pack including a protection circuit (15) which detects an overcharge, an overdischarge, and an overcurrent of a secondary battery and turns off a switch element (M11, M12) disposed on a wiring line between the secondary battery (12) and a load (34) or a charging device (33), the battery pack including: a series circuit of a thermistor (R13) and a resistor (R14), disposed in a vicinity of the secondary battery (12) and connected in parallel with the secondary battery (12); a connection detecting circuit (32, R15) disposed to detect connection of a charging device (33) to the battery pack; a comparator (21) disposed in the protection circuit to compare a voltage of a junction point of the thermistor (R13) and the resistor (R14) with a reference voltage corresponding to a predetermined temperature (V1); and a gate circuit (30, 31) disposed in the protection circuit to activate an output signal of the comparator (21) only when the connection of the charging device (33) is detected by the connection detecting circuit (32, R15), wherein the protection circuit is arranged so that, when a temperature of the secondary battery (12) exceeds the predetermined temperature, the switch element (M11, M12) is turned off in accordance with the output signal of the comparator (21) activated by the gate circuit (30, 31). According to this embodiment of the invention, only when the charging device is connected, the protection function with respect to the temperature of the secondary battery is performed with good accuracy, and the self-heating of the battery pack at the time of discharging can be prevented.

The above-mentioned battery pack may be arranged so that the connection detecting circuit (32, R15) includes a resistor (R15) which pulls up or down a potential of an external terminal (32) to which the charging device is connected, and the potential of the external terminal (32) is pulled down or up by the charging device when the charging device is connected to the external terminal.

The above-mentioned battery pack may be arranged so that the thermistor (R13) is an NTC thermistor having a negative temperature coefficient.

It is to be understood that the reference numerals in parentheses in the foregoing general description are exemplary and explanatory and are not restrictive of the invention.

Effect of the Invention

According to the invention, only when the charging device is connected to the battery pack, the protection function with respect to the temperature of the secondary battery is performed with good accuracy, and the self-heating of the battery pack at the time of discharging can be prevented.

DESCRIPTION OF THE REFERENCE NUMERALS 10 battery pack
12 lithium ion battery
13, 14, 32 external terminals
15 protection IC
16 overcharge detection circuit
17 overdischarge detection circuit
18 overcurrent detection circuit
19 logic circuit
20 constant-voltage source
21 comparator
22 non-sensitive time setting circuit
30 AND circuit
31 inverter
33 charging device
34 load
C1 capacitor
M11, M12 MOS transistors
R11, R12, R14 resistors
R13 thermistor

BEST MODE FOR CARRYING OUT THE INVENTION

Reference Example

Figure 1:
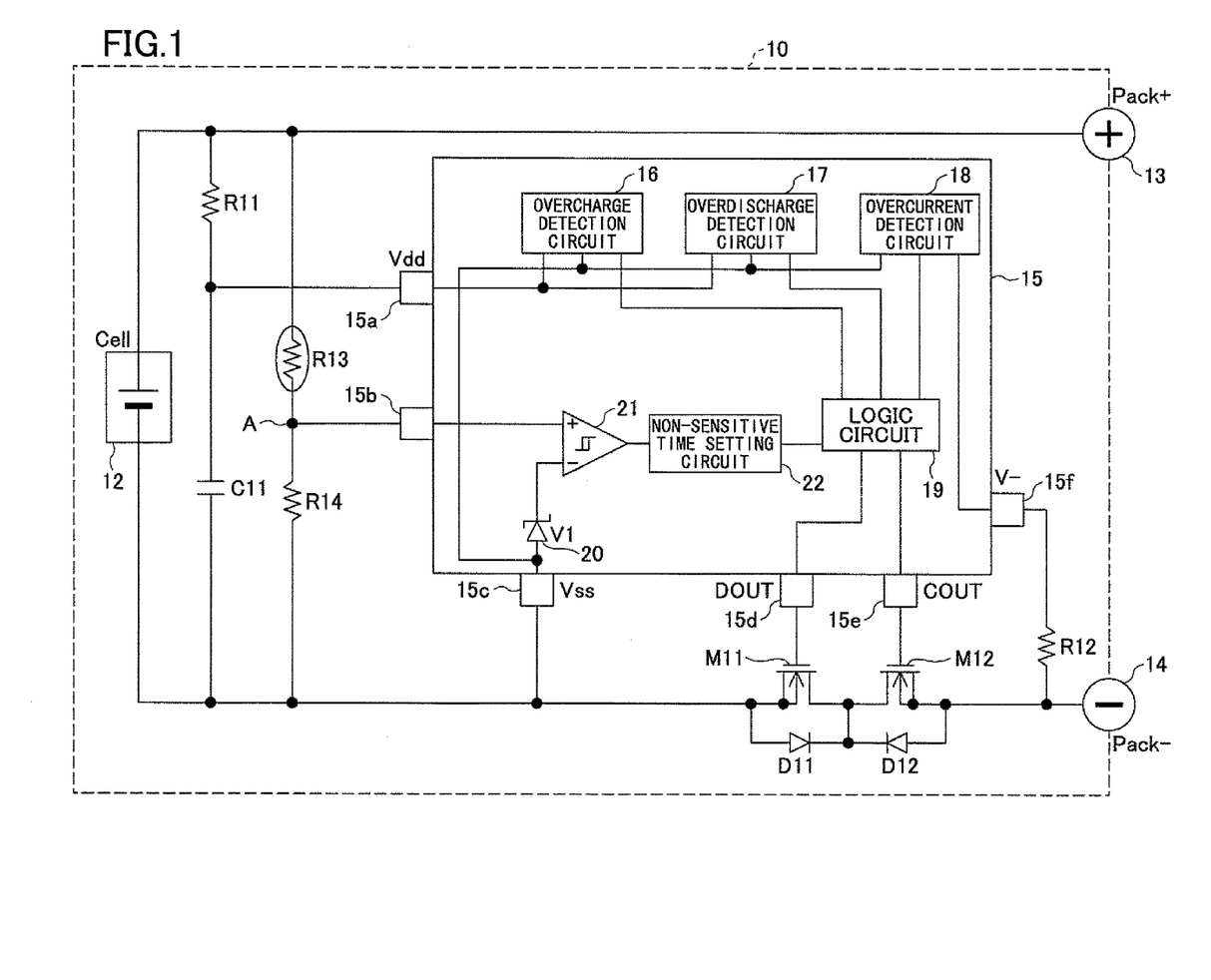
FIG. 1 is a block diagram illustrating the composition of a battery pack of a reference example for comparison with a battery pack according to the invention.

FIG. 1 illustrates the composition of a battery pack of a reference example for comparison with a battery pack according to the invention. As illustrated in FIG. 1, a series circuit in which a resistor R11 and a capacitor C11 are connected in series is connected in parallel with a lithium ion battery 12. A positive electrode of the lithium ion battery 12 is connected to an external terminal 13 of the battery pack 10 by a wiring line, and a negative electrode of the lithium ion battery 12 is connected through a pair of n channel MOS transistors M11 and M12 for current cutoff to an external terminal 14 of the battery pack 10 by a wiring line.

The drains of the MOS transistors M11 and M12 are connected to each other, the source of the MOS transistor M11 is connected to the negative electrode of lithium ion battery 12, and the source of the MOS transistor M12 is connected to the external terminal 14. Body diodes D11 and D12 are connected between the drain and the source of each of the MOS transistors M11 and M12 respectively in an equivalent manner.

Figure 2:
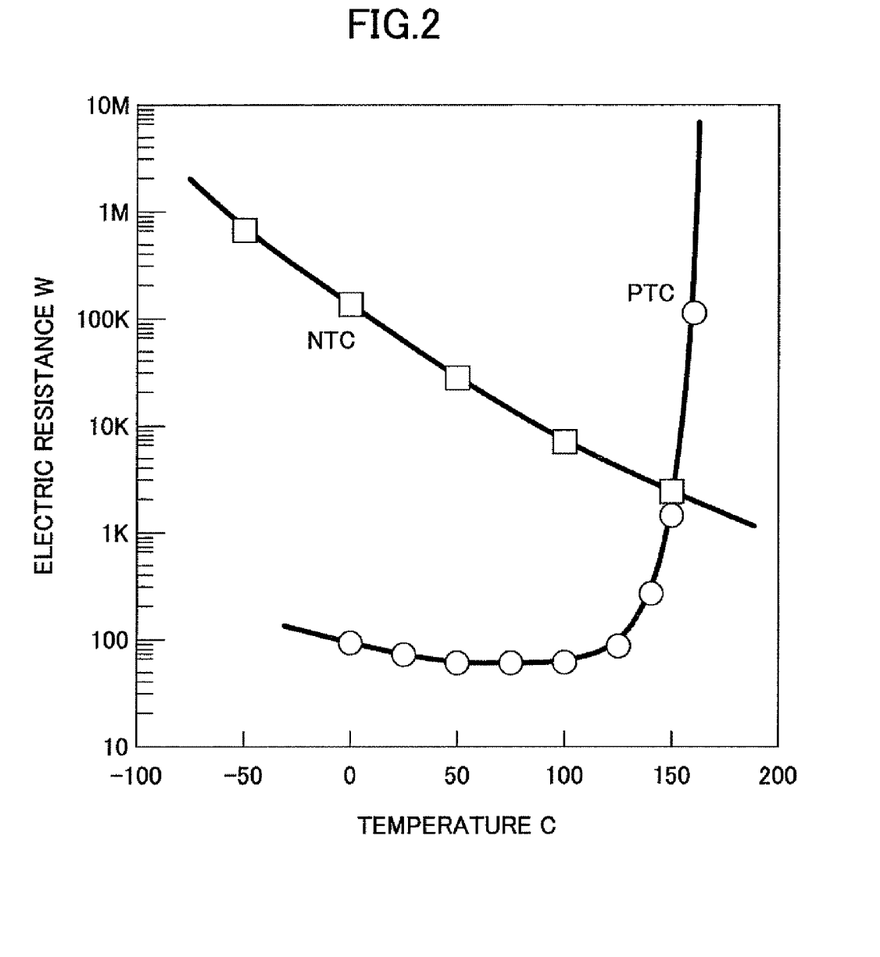
FIG. 2 is a diagram illustrating the temperature-resistance characteristic of each of an NTC thermistor and a PTC thermistor.

Moreover, a series circuit in which a thermistor R13 and a resistor R14 are connected in series is connected in parallel with the lithium ion battery 12. The thermistor R13 is disposed in a vicinity of the lithium ion battery 12 in the battery pack 10 and thermally coupled to the lithium ion battery 12. The thermistor R13 in this example is an NTC (negative temperature coefficient) thermistor having a negative temperature coefficient. FIG. 2 illustrates the temperature-resistance characteristics of each of an NTC thermistor having a negative temperature coefficient and a PTC (positive temperature coefficient) thermistor having a positive temperature coefficient.

A protection IC 15 is arranged in the battery pack 10 to include an overcharge detection circuit 16, an overdischarge detection circuit 17, and an overcurrent detection circuit 18. A power-source voltage Vdd from the positive electrode of the lithium ion battery 12 is supplied through the resistor R11 to a terminal 15a of the protection IC 15 and a power-source voltage Vss from the negative electrode of the lithium ion battery 12 is supplied to a terminal 15c of the protection IC 15 so that the protection IC 15 operates.

The overcharge detection circuit 16 detects an overcharge of the lithium ion battery 12 based on a voltage of the terminals 15a and 15c, and supplies a detection signal to a logic circuit 19. The overdischarge detection circuit 17 detects an overdischarge of the lithium ion battery 12 based on a voltage of the terminals 15a and 15c, and supplies a detection signal to the logic circuit 19. The overcurrent detection circuit 18 detects an overcurrent of the lithium ion battery 12 in which an excessive amount of current flows into a resistor R12, based on a voltage of the terminals 15c and 15f, and supplies a detection signal to the logic circuit 19.

Moreover, a junction point A of the thermistor R13 and the resistor R14 is connected to a terminal 15b of the protection IC 15, one end of the resistor R12 is connected to a terminal 15f of the protection IC 15, and the other end of the resistor R12 is connected to the external terminal 14.

A terminal 15d of the protection IC 15 to which a DOUT output signal is output by the logic circuit 19 is connected to the gate of the MOS transistor M11, and a terminal 15e of the protection IC 15 to which a COUT output signal is output by the logic circuit 19 is connected to the gate of the MOS transistor M12.

In the protection IC 15, the terminal 15b is connected to a non-inverted input terminal of a comparator 21. The terminal 15c of the protection IC 15 is connected to a negative electrode of a constant-voltage source 20 (which is, for example, a Zener diode), and a positive electrode of the constant-voltage source 20 is connected to an inverted input terminal of the comparator 21.

The thermistor R13 in this example is an NTC thermistor having a negative temperature coefficient as illustrated in FIG. 2, and a resistance of the thermistor R13 falls and a voltage of the junction point A rises as the temperature rises.

The comparator 21 provides hysteretic characteristics and compares the voltage of the junction point A with a constant voltage V1 generated by the constant-voltage source 20. When the voltage of the junction point A is higher than the constant voltage V1, the comparator 21 outputs a high-level signal. Namely, when a detected temperature of the thermistor R13 exceeds a predetermined temperature (for example, 70 degrees C.) corresponding to the constant voltage V1, the comparator 21 outputs a high-level high-temperature-detection signal.

The high-temperature-detection signal output by the comparator 21 is supplied to a non-sensitive time setting circuit 22. When a high-level period of the high-temperature-detection signal exceeds a predetermined value (for example, 0.5 seconds), the non-sensitive time setting circuit 22 supplies a high-level high-temperature-detection signal to the logic circuit 19.

Respective detection signals of the overcharge detection circuit 16, the overdischarge detection circuit 17, and the overcurrent detection circuit 18 are supplied to the logic circuit 19. A high-temperature-detection signal output by the non-sensitive time setting circuit 22 is supplied to the logic circuit 19.

When an overcharge detection signal from the overcharge detection circuit 16 is received at the logic circuit 19, the logic circuit 19 sets the COUT output signal, output to the terminal 15e, to a low level, thereby turning off the MOS transistor M12. When an overdischarge detection signal from the overdischarge detection circuit 17 is received at the logic circuit 19, the logic circuit 19 sets the DOUT output signal, output to the terminal 15d, to a low level, thereby turning off the MOS transistor M11. When an overcurrent detection signal from the overcurrent detection circuit 18 is received at the logic circuit 19, the logic circuit 19 sets the DOUT output signal, output to the terminal 15d, to a low level, thereby turning off the MOS transistor M11.

When the high-level high-temperature-detection signal is received at the logic circuit 19, the logic circuit 19 sets the COUT output signal, output to the terminal 15e, to a low level, thereby turning off the MOS transistor M12. Thereby, a temperature of the lithium ion battery 12 can be detected with good accuracy. If the temperature of the lithium ion battery 12 rises to a high temperature, the charging of the lithium ion battery 12 can be stopped immediately, thereby protecting the lithium ion battery 12 from overcharge.

Because the thermistor R13 in this example is an NTC thermistor, the resistance of which changes almost linearly to the temperature as illustrated in FIG. 2, a temperature of the lithium ion battery 12 can be detected with good accuracy. The thermistor R13 is disposed in a vicinity of the lithium ion battery 12 in the battery pack 10, and a temperature of the lithium ion battery 12 can be detected with good accuracy. In this connection, a resistance of a PTC thermistor increases rapidly if a certain temperature is exceeded. For this reason, it is difficult for the PTC thermistor to detect a temperature with good accuracy.

In the above-described battery pack, if a load is connected between the external terminals 13 and 14 when the COUT output signal is set to a low level and the MOS transistor M12 is turned off, the body diode D12 of the MOS transistor M12 is turned on because the DOUT output signal is set to a high level and the MOS transistor M11 is turned on. In this case, the discharging current from the lithium ion battery 12 may flow into the load which is connected between the external terminals 13 and 14.

In the foregoing case, the battery pack 10 may be heated as a result of consumption of electric power Wd represented by the formula Wd=Vf×Id where "Vf" denotes a forward-direction voltage drop of the body diode D12 and "Id" denotes the discharging current supplied to the load. For this reason, there is a possibility that the battery pack 10 may be heated further. A battery pack of an embodiment of the invention is aimed at preventing the self-heating of the battery pack, which will be described in the following.

Embodiment

Figure 3:
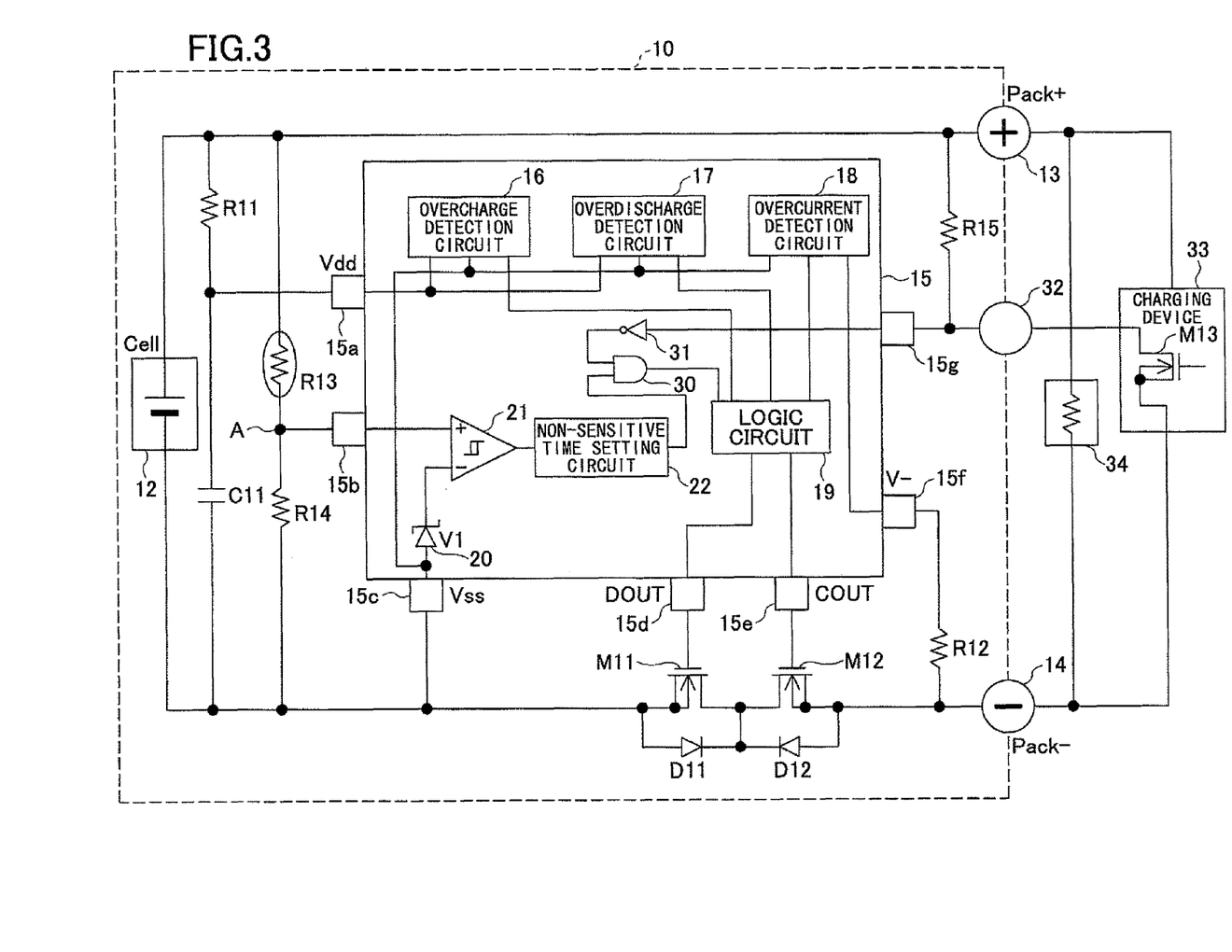
FIG. 3 is a block diagram illustrating the composition of a battery pack of an embodiment of the invention.

FIG. 3 illustrates the composition of a battery pack of an embodiment of the invention. In FIG. 3, the elements which are essentially the same as corresponding elements in FIG. 1 are designated by the same reference numerals.

As illustrated in FIG. 3, a series circuit in which a resistor R11 and a capacitor C1 are connected in series is connected in parallel with a lithium ion battery 12. A positive electrode of the lithium ion battery 12 is connected to an external terminal 13 of the battery pack 10 by a wiring line, and a negative electrode of the lithium ion battery 12 is connected through a pair of n channel MOS transistors M11 and M12 for current cutoff to an external terminal 14 of the battery pack 10 by a wiring line.

The drains of the MOS transistors M11 and M12 are connected to each other, the source of the MOS transistor M11 is connected to the negative electrode of the lithium ion battery 12, and the source of the MOS transistor M12 is connected to the external terminal 14. Body diodes D11 and D12 are connected between the source and the drain of each of the MOS transistor M11 and M12 respectively in an equivalent manner.

Moreover, a series circuit in which a thermistor R13 and a resistor R14 are connected in series is connected in parallel with the lithium ion battery 12. The thermistor R13 is disposed in a vicinity of the lithium ion battery 12 in the battery pack 10 and this thermistor R13 is thermally coupled to the lithium ion battery 12. The thermistor R13 in this embodiment is an NTC (negative temperature coefficient) thermistor having a negative temperature coefficient. FIG. 2 illustrates the temperature-resistance characteristics of each of an NTC thermistor having a negative temperature coefficient and a PTC (positive temperature coefficient) thermistor having a positive temperature coefficient.

A protection IC 15 is arranged in the battery pack 10 to include an overcharge detection circuit 16, an overdischarge detection circuit 17, and an overcurrent detection circuit 18. A power-source voltage Vdd from the positive electrode of the lithium ion battery 12 is supplied through the resistor R11 to a terminal 15a of the protection IC 15 and a power-source voltage Vss from the negative electrode of the lithium ion battery 12 is supplied to a terminal 15c of the protection IC 15 so that the protection IC 15 operates.

The overcharge detection circuit 16 detects an overcharge of the lithium ion battery 12 based on a voltage of the terminals 15a and 15c, and supplies a detection signal to a logic circuit 19. The overdischarge detection circuit 17 detects an overdischarge of the lithium ion battery 12 based on a voltage of the terminals 15a and 15c, and supplies a detection signal to the logic circuit 19. The overcurrent detection circuit 18 detects an overcurrent of the lithium ion battery 12 in which an excessive amount of current flows into a resistor R12, based on a voltage of the terminals 15c and 15f, and supplies a detection signal to the logic circuit 19.

Moreover, a junction point A of the thermistor R13 and the resistor R14 is connected to a terminal 15b of the protection IC 15, one end of the resistor R12 is connected to a terminal 15f of the protection IC 15, and the other end of the resistor R12 is connected to the external terminal 14.

A terminal 15d of the protection IC 15 to which a DOUT output signal is output by the logic circuit 19 is connected to the gate of the MOS transistor M11, and a terminal 15e of the protection IC 15 to which a COUT output signal is output by the logic circuit is connected to the gate of the MOS transistor M12.

In the protection IC 15, the terminal 15b is connected to a non-inverted input terminal of a comparator 21. The terminal 15c of the protection IC 15 is connected to a negative electrode of a constant-voltage source 20 (which is, for example, a Zener diode), and a positive electrode the of constant-voltage source 20 is connected to an inverted input terminal of the comparator 21.

The thermistor R13 in this embodiment is an NTC thermistor having a negative temperature coefficient as illustrated in FIG. 2, and a resistance of the thermistor R13 falls and a voltage of the junction point A rises as the temperature rises.

The comparator 21 provides hysteretic characteristics and compares the voltage of the junction point A with a constant voltage V1 generated by the constant-voltage source 20. When the voltage of the junction point A is higher than the constant voltage V1, the comparator 21 outputs a high-level signal. Namely, when a detected temperature of the thermistor R13 exceeds a predetermined temperature (for example, 70 degrees C.) corresponding to the constant voltage V1, the comparator 21 outputs a high-level high-temperature-detection signal.

The high-temperature-detection signal output by the comparator 21 is supplied to a non-sensitive time setting circuit 22. When a high-level period of the high-temperature-detection signal exceeds a predetermined value (for example, 0.5 seconds), the non-sensitive time setting circuit 22 supplies a high-level high-temperature-detection signal to an input terminal of an AND circuit (AND gate) 30.

On the other hand, a terminal 15g of the protection IC 15 is connected through an inverter 31 to the other input terminal of the AND circuit 30. The terminal 15g of the protection IC 15 is connected to an external terminal 32 of the battery pack 10, and this terminal 15g is further connected through a resistor R15 to the positive electrode of the lithium ion battery 12.

Upon charging of the lithium ion battery 12, a charging device 33 is connected to each of the external terminals 13, 14 and 32 of the battery pack 10 respectively. In this state, the lithium ion battery 12 is charged with electric current supplied from the external terminals 13 and 14. At the same time, a potential of the external to terminal 32 is pulled down to the ground level by a MOS transistor M13 which is provided in the charging device 33. When the charging device 33 is not connected to the battery pack 10, the potential of the external terminal 32 is pulled up to the power-source voltage Vdd by the resistor R15.

For this reason, when the charging device 33 is connected, the signal at the other input terminal of the AND circuit 30 is set to a high-level, and a high-level high-temperature-detection signal output by the non-sensitive time setting circuit 22 is supplied through the AND circuit 30 to the logic circuit 19.

On the other hand, when the charging device 33 is not connected, the signal at the other input terminal of the AND circuit 30 is set to a low level, and the supply of a high-level high-temperature-detection signal to the logic circuit 19 is prevented by the AND circuit 30. A high-level high-temperature-detection signal output by the non-sensitive time setting circuit 22 in the latter case is not supplied to the logic circuit 19.

Respective detection signals of the overcharge detection circuit 16, the overdischarge detection circuit 17, and the overcurrent detection circuit 18 are supplied to the logic circuit 19. A high-level high-temperature-detection signal output by the non-sensitive time setting circuit 22 is supplied to the logic circuit 19.

When an overcharge detection signal from the overcharge detection circuit 16 is received at the logic circuit 19, the logic circuit 19 sets the COUT output signal, output to the terminal 15e, to a low level, thereby turning off the MOS transistor M12. When an overdischarge detection signal from the overdischarge detection circuit 17 is received at the logic circuit 19, the logic circuit 19 sets the DOUT output signal, output to the terminal 15d, to a low level, thereby turning off the MOS transistor M11. When an overcurrent detection signal from the overcurrent detection circuit 18 is received at the logic circuit 19, the logic circuit 19 sets the DOUT output signal, output to the terminal 15d, to a low level, thereby turning off the MOS transistor M11.

Upon charging of the lithium ion battery 12 by the charging device 33 which is connected to the external terminals 13, 14 and 32 of the battery pack 10 respectively, if a high-level high-temperature-detection signal output by the non-sensitive time setting circuit 22 is received at the logic circuit 19, the logic circuit 19 sets the COUT output signal, output to the terminal 15e, to a low level, thereby turning off the MOS transistor M12. Accordingly, a temperature of the lithium ion battery 12 can be detected with good accuracy. If the temperature of the lithium ion battery 12 rises to a high temperature, the charging of the lithium ion battery 12 can be stopped immediately, thereby protecting the lithium ion battery 12 from overcharge. In this situation, a load 34 may be connected between the external terminals 13 and 14.

On the other hand, when the load 34 is connected between the external terminals 13 and 14 of the battery pack 10 and the charging device 33 is not connected thereto, a high-level high-temperature-detection signal is never supplied to the logic circuit 19. A high-temperature-detection signal output to the logic circuit 19 by the non-sensitive time setting circuit 22 is set to a low level, and the logic circuit 19 sets the GOUT output signal, output to the terminal 15e, to a high-level, thereby turning on the MOS transistor M12. Accordingly, the body diode 012 is never turned on, and the self-heating of the battery pack 10 can be prevented.

When both the charging device 33 and the load 34 are connected to the external terminals 13, 14 and 32 of the battery pack 10, electric power from the charging device 33 is supplied to the load 34. Even if the MOS transistor M12 is in an OFF state, the body diode D12 is never turned ON.

Alternatively, the battery pack may be arranged so that, instead of the resistor R15 in the above-described embodiment, a pull-down resistor R15 is connected between the external terminal 14 and the terminal 32 in order to pull down the potential of the terminal 32 when the charging device 33 is not connected. When the charging device 33 is connected to the battery pack of this alternative embodiment, the potential of the external terminal 32 is pulled up to the power-source voltage by the MOS transistor M13 of the charging device 33. In this case, it is not necessary to use the inverter 31.

This international application claims foreign priority of Japanese Patent Application No. 2007-166666, filed on Jun. 25, 2007, the contents of which are incorporated herein by reference in their entirety.

The invention claimed is:

1. A battery pack comprising:
a protection circuit disposed in the battery pack to detect an overcharge, an overdischarge, and an overcurrent of a secondary battery and turn off a switch element disposed on a wiring line between the secondary battery and a load or a charging device;
a series circuit of a thermistor and a resistor, which is disposed in the battery pack in a vicinity of the secondary battery and connected in parallel with the secondary battery;
a connection detecting circuit disposed in the battery pack to detect connection between the charging device and the battery pack via a first terminal;
a comparator disposed in the protection circuit to compare a voltage of a junction point of the thermistor and the resistor with a reference voltage corresponding to a predetermined temperature; and
a gate circuit disposed in the protection circuit to activate an output signal of the comparator only when the connection between the charging device and the battery pack is detected by the connection detecting circuit,
wherein, when a temperature of the secondary battery exceeds the predetermined temperature, the protection circuit turns off the switch element in accordance with the output signal of the comparator activated by the gate circuit, so that the secondary battery is disconnected from the changing device by the turned-off switching element on the wiring line.

2. The battery pack according to claim 1, wherein the connection detecting circuit includes a resistor which is connected to the first terminal to pull up or down a potential of the first terminal where the charging device is to be connected to the battery pack, and wherein the potential of the first terminal is pulled down by the charging device when the charging device is connected to the battery pack.

3. The battery pack according to claim 1, wherein the thermistor is an NTC thermistor having a negative temperature coefficient.

* * * * *